US012633516B2

(12) United States Patent
Erk et al.

(10) Patent No.: US 12,633,516 B2
(45) Date of Patent: May 19, 2026

(54) PROCESS FOR MAKING A DOPED CATHODE ACTIVE MATERIAL

(71) Applicant: BASF SE, Ludwigshafen am Rhein (DE)

(72) Inventors: Christoph Erk, Ludwigshafen (DE); Heino Sommer, Eggenstein-Leopoldshafen (DE); Kathrin Michel, Ludwigshafen (DE); Frank Rauscher, Ludwigshafen (DE); Nils-Olof Joachim Born, Ludwigshafen (DE); Wolfgang Rohde, Ludwigshafen (DE); Carsten Sueling, Ludwigshafen (DE); Birgit Gerke, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 542 days.

(21) Appl. No.: 18/247,067

(22) PCT Filed: Sep. 16, 2021

(86) PCT No.: PCT/EP2021/075438

§ 371 (c)(1),
(2) Date: Mar. 28, 2023

(87) PCT Pub. No.: WO2022/069236

PCT Pub. Date: Apr. 7, 2022

(65) Prior Publication Data

US 2023/0378428 A1 Nov. 23, 2023

(30) Foreign Application Priority Data

Sep. 30, 2020 (EP) .................................... 20199327

(51) Int. Cl.

| | |
|---|---|
| ***H01M 4/525*** | (2010.01) |
| ***H01M 4/04*** | (2006.01) |
| ***H01M 4/62*** | (2006.01) |
| ***H01M 10/0525*** | (2010.01) |
| ***H01M 10/54*** | (2006.01) |
| *H01M 4/02* | (2006.01) |

(52) U.S. Cl.

CPC ......... *H01M 4/0471* (2013.01); *H01M 4/525* (2013.01); *H01M 4/622* (2013.01); *H01M 4/625* (2013.01); *H01M 10/0525* (2013.01); *H01M 2004/021* (2013.01); *H01M 10/54* (2013.01)

(58) Field of Classification Search

None

See application file for complete search history.

(56) References Cited

U.S. PATENT DOCUMENTS

| | | | |
|---|---|---|---|
| 5,773,168 | A | 6/1998 | Kubo et al. |
| 2013/0209840 | A1 | 8/2013 | Volkov et al. |
| 2015/0064563 | A1 | 3/2015 | Kim et al. |

FOREIGN PATENT DOCUMENTS

| | | | |
|---|---|---|---|
| CN | 110993936 A | | 4/2020 |
| WO | 2004082046 A1 | | 9/2004 |
| WO | 2010029745 A1 | | 3/2010 |

OTHER PUBLICATIONS

International Search Report and Written Opinion for corresponding PCT/EP2021/075438 mailed Dec. 3, 2021; 9 pages.

Zhou Shuo et al, "Enhanced rate performance and high potential as well as decreased strain of LiNi0.6Co0.2Mn0.2O2 by facile fluorine modification", Electrochimica Acta,vol. 261, Dec. 28, 2017 (Dec. 28, 2017), p. 565-577.

Chen, et al., "Controlled synthesis of concentration gradient LiNi0. 84Co0.10Mn0.04AI0.02O1.90F0.10 with improved electrochemical properties in Li-ion batteries", RSC Advances , vol. 6, Issue 63, Jun. 2, 2016, pp. 58173-58181.

European Search Report for EP Patent Application No. 20199327.6, Issued on Mar. 30, 2021, 4 pages.

Li, et al., "Environmentally-friendly oxygen-free roasting/wet magnetic separation technology for in situ recycling cobalt, lithium carbonate and graphite from spent LiCoO2/graphite lithium batteries", Journal of Hazardous Materials, vol. 302, Jan. 25, 2016, pp. 97-104.

Wang, et al., "Role of fluorine surface modification in improving electrochemical cyclability of concentration gradient Li [Ni0.73Co0. 12Mn0. 15]O2 cathode material for Li-ion batteries", RSC Advances, vol. 6, Issue 31, Mar. 1, 2016, pp. 26307-26316.

Yue, et al., "A low temperature fluorine substitution on the electrochemical performance of layered LiNi0.8Co0.1Mn0. 1O2-zFz cathode materials", Electrochimica Acta, vol. 92, Mar. 1, 2013, pp. 1-8.

Zhang, et al., "Effects of fluorine doping on nickel-rich positive electrode materials for lithium-ion batteries", Journal of The Electrochemical Society, vol. 167, Issue 8, May 1, 2020, 11 pages.

*Primary Examiner* — Carlos Barcena
(74) *Attorney, Agent, or Firm* — Armstrong Teasdale LLP

(57) ABSTRACT

Described herein is a process for the manufacture of a fluoride doped cathode active material, where said process includes the steps of (a) providing a particulate oxide or (oxy)hydroxide of transition metals (TM), where TM includes nickel and at least one metal selected from cobalt and manganese, and where said particulate oxide or (oxy)hydroxide has an average particle diameter (D50) in a range of from 3 to 16 μm,
(b) providing a source of lithium that includes 0.01 to 2.5% by weight of fluoride uniformly dispersed within said source of lithium,
(c) mixing said oxide or (oxy)hydroxide of TM with said fluoride-including source of lithium and, optionally, with an additional source of lithium including less fluoride, and, optionally, with one or more dopants based on at least one metal other than lithium, and
(d) treating the mixture obtained from step (c) thermally.

9 Claims, No Drawings

PROCESS FOR MAKING A DOPED CATHODE ACTIVE MATERIAL

CROSS-REFERENCE TO RELATED APPLICATIONS

This application is a U.S. National Phase Application of PCT/EP2021/075438, filed Sep. 16, 2021, which claims the benefit of priority to European Patent Application No. 20199327.6, filed Sep. 30, 2020, the entire contents of which are hereby incorporated by reference herein.

The present invention is directed towards a process for the manufacture of a fluoride doped cathode active material wherein said process comprises the steps of (a) providing a particulate oxide or (oxy)hydroxide of TM wherein TM comprises nickel and at least one metal selected from cobalt and manganese, wherein said particulate oxide or (oxy)hydroxide has an average particle diameter (D50) in the range of from 3 to 16 μm, (b) providing a source of lithium that contains 0.01 to 2.5% by weight of fluoride, uniformly dispersed within said source of lithium, (c) mixing said oxide or (oxy)hydroxide of TM with said fluoride-containing source of lithium and, optionally, with additional source of lithium containing less fluoride, and, optionally, with one or more dopants based on at least one metal other than lithium, (d) treating the mixture obtained from step (c) thermally.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Cathode active materials are generally manufactured by using a two-stage process. In a first stage, a sparingly soluble compound of the transition metal(s) is made by precipitating it from a solution, for example a carbonate or a hydroxide. Said sparingly soluble salts are in many cases also referred to as precursors. In a second stage, a precursor is mixed with a lithium compound, for example $Li_2CO_3$, LiOH or $Li_2O$, and calcined at high temperatures, for example at 600 to 1100° C. In special recipes, dopants may be added, for example alumina, titania, zirconia, or oxides or (oxy)hydrides of transition metals such as Nb, Ta, W, Mo or the like.

Currently, a certain interest in so-called nickel-rich electrode active materials may be observed, for example electrode active materials that contain at least 50 mole-% or even 75 mole-% or more of Ni, referring to the total metal content, metal referring to metals other than lithium. Several technical questions are still to be resolved. Volumetric energy density, capacity fade, cycling stability are still fields of research and development. Some of the issues are attributed to the volume change of cathode active materials during charging and discharging. It has been suggested to reduce the volume change by incorporating fluoride, see, e.g., U.S. Pat. No. 5,773,168. The process disclosed is to mix small amounts of lithium fluoride with another source of lithium, e.g., lithium carbonate, followed by calcination. However, the quality of such materials is often quite uneven. In US 2015/0064563, it has been suggested to incorporate fluoride by thermal treatment of a cathode active material with a fluorinated polymer, for example polyvinylidene difluoride.

In US 2013/0209840, a fluoride coating process is disclosed. A fluoride coating only affects the outer surface of the respective cathode active material. In N. Zhang et al., *J. Electrochem. Soc.* 2020, 167, 080815, the authors report on experiments with fluoride doping by mixing a precursor with $LiOH \cdot H_2O$ and LiF followed by a two-step calcination.

It was therefore an objective of the present invention to provide a cathode active material with improved stability such as lower capacity fading and improved cycling stability. It was further an objective to provide a process for making a cathode active material with improved stability such as lower capacity fading and improved cycling stability.

Accordingly, the process defined at the outset has been found, hereinafter also referred to as "inventive process" or as "process according to the (present) invention". The inventive process comprises a sequence of several steps as defined at the outset, hereinafter also defined as step (a), step (b), step (c) etc. The inventive process will be described in more detail below.

Step (a) includes providing a particulate oxide or (oxy) hydroxide of TM wherein TM comprises nickel and at least one metal selected from cobalt and manganese, wherein said particulate oxide or (oxy)hydroxide has an average particle diameter (D50) in the range of from 3 to 16 μm, preferably 5 to 12 μm. Said particulate oxide or (oxy)hydroxide of TM is also referred to as "precursor".

In one embodiment of the present invention, said precursor comprises at least one of Mg, Al and Y or at least one transition metal selected from Ti, Zr, Nb, Ta, Fe, Mo, and W. In other embodiments, said precursor does not contain any metals other than nickel, cobalt and manganese or nickel, cobalt and aluminum.

In one embodiment of the present invention, TM corresponds to the general formula (I)

$$(Ni_aCo_bMn_c)_{1-d}M_d \quad (I)$$

wherein a is in the range of from 0.6 to 0.99, preferably from 0.6 to 0.95, more preferably from 0.8 to 0.93, b is zero or in the range of from 0.01 to 0.2, preferably from 0.05 to 0.1, c is in the range of from zero to 0.2, preferably from 0.03 to 0.15, and d is in the range of from zero to 0.1, preferably from 0.01 to 0.05

M is at least one of Al, Mg, Ti, Mo, Nb, Ta, W and Zr, and $$b+c > \text{zero, and } a+b+c=1.$$

Said precursor is preferably obtained by co-precipitating nickel, cobalt and manganese as hydroxides from an aqueous solution containing nitrates, acetates or preferably sulfates of nickel and cobalt and/or manganese in a stoichiometric ratio corresponding to TM. Said co-precipitation may be accomplished by the addition of alkali metal hydroxide, for example potassium hydroxide or sodium hydroxide, in a continuous, semi-continuous or batch process. Said co-precipitation is then followed by removal of the mother liquor, for example by filtration, and subsequent removal of water.

Said precursor is in particulate form. In one embodiment of the present invention, the mean particle diameter (D50) of said precursor is in the range of from 3 to 16 μm, preferably 5 to 12 μm and more preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

The particle shape of the secondary particles of said precursor is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, said precursor is comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, said precursor may have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) of said precursor is in the range of from 2 to 10 $m^2/g$ or even more than 10 up to 100 $m^2/g$, determined by nitrogen adsorption, for example in accordance with to DIN-ISO 9277:2003-05.

Some metals are ubiquitous, such as sodium, calcium or zinc, and traces of them virtually present everywhere, but such traces will not be taken into account in the description of the present invention. Traces of metals in this context will mean amounts of 0.05 mol-% or less, referring to the total metal content TM.

Said precursor may contain sulfate, for example 0.1 to 0.5% by weight of sulfate, determined by ion chromatography. Said precursor may contain carbonate, for example 0.1 to 2% by weight of carbonate, each percentage relating to the entire weight of the precursor.

In step (b), a source of lithium is provided wherein said source contains 0.01 to 2.5% by weight of fluoride, uniformly dispersed within said source of lithium. Preferred are 0.05 to 0.5% by weight. The percentages are referring to the respective lithium source. Said fluoride is preferably lithium fluoride but may bear counterions other than lithium and stemming from impurities. Preferably, the majority of said fluoride is lithium fluoride. Even more preferred, said fluoride is lithium fluoride.

Sources of lithium are selected from lithium carbonate, lithium oxide, $Li_2O$, and lithium hydroxide, LiOH, and include hydrates of lithium hydroxide such as, but not limited to $LiOH\cdot H_2O$. Preferred are lithium oxide, $Li_2O$, and lithium hydroxide, LiOH.

In said source of lithium, fluoride is uniformly dispersed, preferably as lithium fluoride. The term "uniformly dispersed" means that no separate crystals or accumulations of fluorides or even of LiF may be detected e.g., by X-ray diffraction, particle size distribution, optical microscopy and SEM/EDX (scanning electron microscopy/energy dispersive X-ray spectroscopy). Preferred are and particle size distribution and X-ray diffraction and SEM/EDX.

Preferably, said fluoride-containing source of lithium is made by recycling of spent batteries, for example by a recycling process in which lithium carbonate or lithium hydroxide is recovered from a solution of lithium salt that includes a fluoride, for example stemming from an electrolyte such as $LiPF_6$ or from decomposed fluorine-containing polymer binder.

In one embodiment of the present invention, said recycling process comprises the steps of:

(i) making a black powder, sometimes also named black mass or active mass, from the spent lithium ion battery by mechanically destroying the battery, followed by thermal treatment, (ii) treating the black powder with at least one of $Ca(OH)_2$ or $Mg(OH)_2$ in the presence of water or a polar solvent other than water, at a temperature of at least 70° C., preferably from 70 to 120° C., (iii) separating the solids from the liquid, optionally followed by washing the solid residue with a polar solvent such as water, preferably by filtration, thereby obtaining a solution of lithium hydroxide containing fluoride, and (iv) removing the water from the solution of lithium hydroxide in one or more steps, for example by evaporation to yield solid LiOH, optionally after purifying the solution.

In another embodiment, steps (i) to (iii) are followed by step (v), (v) adding $CO_2$ or any water-soluble carbonate, e.g. $Na_2CO_3$, to precipitate $Li_2CO_3$, (vi) separating the solids from the liquid by a solid-liquid-separation method, for example filtration, optionally followed by washing the solid residue with a polar solvent such as water, thereby obtaining a solid lithium carbonate containing fluoride.

Lithium hydroxide made according to the above recycling process usually contains 0.01 to 1.3% by weight fluoride, referring to the monohydrate of LiOH, preferably 0.05 to 0.5% by weight. Depending on the drying conditions, anhydrous LiOH instead of the monohydrate is obtained. In this case, the above-mentioned characteristic amounts of impurities, which are related to the monohydrate, have a higher concentration, respectively, by a factor of about 1.75 (corresponds to the molar weight of the monohydrate divided by the molar weight of the anhydrate) for 100% water free LiOH.

Lithium carbonate made according to the above recycling process usually contains 0.01 to 1.5% by weight fluoride, preferably 0.05 to 0.5% by weight.

Step (c) includes mixing oxide or (oxy)hydroxide of TM with said fluoride-containing source of lithium and, optionally, with additional source of lithium containing less fluoride, and, optionally, with one or more dopants based on at least one metal other than lithium. By performing step (c), a mixture is obtained. The expression "said fluoride-containing source of lithium" is the one provided in step (b). The expression "containing less fluoride" refers to a comparison with the source of lithium provided in step (b).

The amounts in which precursor and total source of lithium are mixed will correspond to the desired stoichiometry of the intended cathode active material. Usually, stoichiometric amounts or even a slight excess of lithium with respect to metals other than lithium is chosen.

Step (c) may include mixing with additional source of lithium that contains less fluoride than the source of lithium provided in step (b), for example 1 to 15 ppm, or even below detection level.

Dopants are selected from oxides, hydroxides and oxyhydroxides of Mg, Ti, Zr, W, Nb, Ta, and especially of Al. Lithium titanate is a possible source of titanium. Examples of dopants are MgO, $Mg(OH)_2$, $TiO_2$ selected from rutile and anatase, anatase being preferred, furthermore basic titania such as $TiO(OH)_2$, furthermore $Li_4Ti_5O_{12}$, $ZrO_2$, $Zr(OH)_4$, $Li_2ZrO_3$, $Nb_2O_3$, $Ta_2O_5$, $Li_2WO_4$, $WO_3$, $MoO_3$, $Li_2MoO_4$, $Al(OH)_3$, $Al_2O_3$, $Al_2O_3 \cdot aq$, and AlOOH. Preferred are Al compounds such as $Al(OH)_3$, $\alpha$-$Al_2O_3$, $\gamma$-$Al_2O_3$, $Al_2O_3 \cdot aq$, and AlOOH, and $TiO_2$ and $Zr(OH)_4$. Even more preferred dopants are $Al_2O_3$ selected from $\alpha$-$Al_2O_3$, $\gamma$-$Al_2O_3$, and most preferred is $\gamma$-$Al_2O_3$.

In a preferred embodiment, dopant(s) is/are applied in an amount of up to 2.5 mole %, referring to TM, preferably 0.1 up to 1.5 mole %.

Examples of suitable apparatuses for performing step (c) are high-shear mixers, tumbler mixers, plough-share mixers and free fall mixers.

In one embodiment of the present invention, step (c) is performed at a temperature in the range of from ambient temperature to 200° C., preferably 20 to 50° C.

In one embodiment of the present invention, step (c) has a duration of 10 minutes to 2 hours. Depending on whether additional mixing is performed in step (d) or not, thorough mixing has to be accomplished in step (c).

Mixing of precursor, source of lithium from step (b) and—optional—further source of lithium and/or dopant(s) may be performed all in one or in sub-steps, for example by first mixing source of lithium containing fluoride and dopant(s) and adding such mixture to a precursor, or by first mixing precursor and source of lithium containing fluoride and then adding dopant and more source of lithium, or by first mixing dopant and precursor and then adding source of lithium containing lithium fluoride and more source of lithium. It is preferred to first mix precursor and both sources of lithium and to then add dopant.

In one embodiment of the present invention, step (c) comprises the two sub-steps (c1) mixing fluoride-containing source of lithium and fluoride-free source of lithium and, optionally, said dopant(s), (c2) mixing the mixture obtained from step (c1) with said oxide or (oxy)hydroxide of TM.

In one embodiment of the present invention, the weight ratio of fluoride-containing source of lithium as provided in step (b) and fluoride-free source of lithium is in the range of from 1:1 and 1:20.

Although it is possible to add an organic solvent, for example glycerol or glycol, or water in step (c) it is preferred to perform step (c) in the dry state, that is without addition of water or of an organic solvent.

A mixture is obtained.

Step (d) includes subjecting said mixture to heat treatment, for example at a temperature in the range of from 600 to 950° C., preferably 650 to 925° C.

In one embodiment of the present invention, the mixture from step (c) is heated to 650 to 1000° C. with a heating rate of 0.1 to 10° C./min.

In one embodiment of the present invention, the temperature is ramped up before reaching the desired temperature of from 650 to 1000° C., preferably 750 to 900° C. For example, first the mixture from step (c) is heated to a temperature to 350 to 550° C. and then held constant for a time of 10 min to 4 hours, and then it is raised to 650° C. up to 1000° C.

In embodiments wherein in step (c) at least one solvent has been used, as part of step (d), or separately and before commencing step (d), such solvent(s) are removed, for example by filtration, evaporation or distilling of such solvent(s). Preferred are evaporation and distillation.

In one embodiment of the present invention, step (d) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (d) is performed in an oxygen-containing atmosphere, for example in a nitrogen-air mixture, in a rare gas-oxygen mixture, in air, in oxygen or in oxygen-enriched air. In a preferred embodiment, the atmosphere in step (d) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, the stoichiometry of lithium in step (c) is in the range of from 90 to 95 mol-% relative to the sum of TM and metals other than lithium from the dopant(s), if applicable, and step (d) is followed by another mixing step with a source of lithium and another heat treatment step.

By performing the inventive process, a cathode active material is made that shows excellent stability such as a low capacity fade and a high cycling stability.

Another aspect of the present invention is a cathode active material, hereinafter also referred to as inventive cathode active material. Inventive cathode active material may be described by the general formula $Li_{1+x}TM_{1-x}O_{2-y}F_y$ and has an average particle diameter (D50) in the range of from 3 to 16 μm, preferably 5 to 12 μm and more preferably 7 to 10 μm. TM in inventive cathode active material includes Ni and at least one of Mn and Co and x is in the range of from zero to 0.2, and y is in the range of from 0.0002 to 0.03, and F is uniformly distributed in such cathode active material.

F as fluoride is uniformly distributed in inventive cathode active materials. This means that F is not accumulated at the outer surface of the secondary particles but is inside of the secondary particles. Some fluoride may be accumulated at the grain boundaries of the primary particles but preferably, there are no accumulations. In addition, there are only few to no secondary particles that do not contain fluoride.

Inventive cathode active materials are in particulate form. In one embodiment of the present invention, the mean particle diameter (D50) of inventive cathode active materials is in the range of from 3 to 16 μm, preferably 5 to 12 μm and more preferably 7 to 10 μm. The mean particle diameter (D50) in the context of the present invention refers to the median of the volume-based particle diameter, as can be determined, for example, by light scattering. In one embodiment, the precursor has a monomodal particle diameter distribution. In other embodiments, the particle distribution of the precursor may be bimodal, for example with one maximum in the range of from 1 to 5 μm and a further maximum in the range of from 7 to 16 μm.

The particle shape of the secondary particles of inventive cathode active materials is preferably spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, inventive cathode active materials are comprised of secondary particles that are agglomerates of primary particles. Preferably, said precursor is comprised of spherical secondary particles that are agglomerates of primary particles. Even more preferably, said precursor is comprised of spherical secondary particles that are agglomerates of spherical primary particles or platelets.

In one embodiment of the present invention, inventive cathode active materials have a particle diameter distribution span in the range of from 0.5 to 0.9, the span being defined as [(D90)−(D10)] divided by (D50), all being determined by LASER analysis. In another embodiment of the present invention, said precursor may have a particle diameter distribution span in the range of from 1.1 to 1.8.

In one embodiment of the present invention the specific surface (BET) in inventive cathode active materials is in the range of from 0.1 to 1.5 $m^2/g$ and preferably from 0.2 up to 1.0 $m^2/g$, determined by nitrogen adsorption, for example in accordance with to DIN-ISO 9277:2003-05.

In one embodiment of the present invention, TM in inventive cathode active materials is a combination of metals according to general formula (I)

$$(Ni_aCo_bMn_c)_{1-d}M_d \quad (I)$$

wherein a is in the range of from 0.6 to 0.99, preferably from 0.6 to 0.95, more preferably from 0.8 to 0.93, b is zero or in the range of from 0.01 to 0.2, preferably from 0.05 to 0.1, c is in the range of from zero to 0.2, preferably from 0.03 to 0.15, and d is in the range of from zero to 0.1, preferably from 0.01 to 0.05, M is at least one of Al, Mg, Ti, Mo, Nb, Ta, W and Zr, and $$a+b+c=1.$$

A further aspect of the present invention refers to electrodes comprising at least one particulate cathode active material according to the present invention. They are particularly useful for lithium ion batteries. Lithium ion batteries comprising at least one electrode according to the present invention exhibit a good cycling behavior/stability. Electrodes comprising at least one particulate cathode active material according to the present invention are hereinafter also referred to as inventive cathodes or cathodes according to the present invention.

Specifically, inventive cathodes contain (A) at least one inventive particulate cathode active material, (B) carbon in electrically conductive form, (C) a binder material, also referred to as binders or as binders (C), and, preferably, (D) a current collector.

In a preferred embodiment, inventive cathodes contain (A) 80 to 98% by weight inventive particulate cathode active material, (B) 1 to 17% by weight of carbon, (C) 1 to 15% by weight of binder, percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to inventive cathode active material. In other embodiments, inventive cathodes may comprise 0.1 up to less than 1% by weight of binder(s).

A further aspect of the present invention is a battery, containing at least one cathode comprising inventive cathode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

(II)

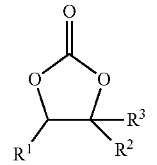

(III)

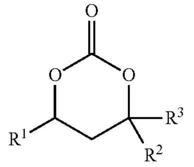

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

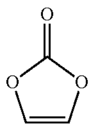

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among LiC$(CF_3SO_2)_3$, $LiN(CF_3SO_2)_2$, $LiPF_6$, $LiBF_4$, $LiClO_4$, with particular preference being given to $LiPF_6$ and LiN$(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good cycling stability and a low capacity fading.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

Description of Methods

Li within aqueous solutions was determined by optical emission spectroscopy using an inductively coupled plasma (ICP-OES). Instrument: ICP-OES Agilent 5100 SVDV; wavelength: Li 670.783 nm; internal standard: Sc 361.383 nm; dilution factor: Li; calibration: external.

Elemental analysis of fluorine and fluoride was performed in accordance with standardized methods: DIN EN 14582: 2016-12 with regard to the sample preparation for the overall fluorine content determination (waste samples); the detection method is an ion selective electrode measurement. DIN 38405-D4-2:1985-07 (water samples; digestion of inorganic solids with subsequent acid-supported distillation and fluoride determination using ion selective electrode).

Starting Materials:

"Battery grade" $LiOH \cdot H_2O$, hereinafter also referred to as "LiOH b.g.", commercially available from Livent, with a fluoride content of less than 5 ppm LiF is commercially obtained from Sigma Aldrich I. Providing Starting Materials for the Calcination I.1 Synthesis of a Precursor, Step (a.1)

A stirred tank reactor was charged with an aqueous solution 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained the sulfates of Ni, Co and Mn at a molar ratio of 8.3:1.2:0.5 and a total transition metal concentration of 1.65 mol/kg. The aqueous sodium hydroxide solution contained 25 wt. % sodium hydroxide solution and 25 wt. % ammonia solution in a weight ratio of 6. The pH value was kept at 12 by the separate feed of an aqueous sodium hydroxide solution. Beginning with the commencement of all feeds, mother liquor was removed continuously. After 33 hours all feed flows were stopped. The mixed transition metal (TM) oxyhydroxide precursor TM-OH.1 was obtained by filtration of the resulting suspension, washing with distilled water, drying at 120° C. in air and sieving. (D50): 10 μm.

I.2 Synthesis of a LiOH that Contains LiF, Step (b.1)

An amount of ~1 t mechanically treated battery scrap containing spent cathode active material containing nickel, cobalt and manganese, organic carbon in the form of graphite and soot and residual electrolyte, and further impurities inter alia comprising fluorine compounds, phosphorous and calcium was treated to obtain a reduced mass according to the process described in Jia Li et al., *Journal of Hazardous Materials* 2016, 302, 97-104. The atmosphere within the roasting system is air whose oxygen reacts with the carbon in the battery scrap to form carbon monoxide, treatment temperature is 800° C.

After reaction and cool down to ambient temperature, the heat-treated material was recovered from the furnace, mechanically treated to obtain a particulate material and analyzed by means of X-ray powder diffraction, elemental analysis and particle size distribution.

The Li content was 3.6 wt.-%, which acts as reference for the following leaching procedure (see below). Fluorine (2.6 wt.-%) is mainly represented as inorganic fluoride (2.3 wt.-%). Particle sizes are well below 1 mm; D50 is determined to be 17.36 μm.

Comparing the obtained XRD pattern with calculated reference patterns of Ni (which is identical with that one of $Co_xNi_{1-x}$, x=0 to 0.6, Co, $Li_2CO_3$ and $LiAlO_2$, it can be concluded that Ni is exclusively present as metallic phase, as pure Ni or as an alloy in combination with Co. The whole sample shows typical ferromagnetic behavior when it gets in touch with a permanent magnetic material. As lithium salts, $Li_2CO_3$ as well as $LiAlO_2$ are clearly identified by their characteristic diffraction pattern.

Leaching the thermally treated black mass with $Ca(OH)_2$:

A PFA flask is charged with 30 g of the above-mentioned thermally treated battery scrap material and with 9 g of solid $Ca(OH)_2$. The solids are mixed. Then, 200 g of water are added with stirring, and the whole mixture is refluxed for 6 hours. After 6 hours, the solid content is filtrated off and filtrate samples are taken and analyzed with regard to Li (c(Li)=0.49 wt.-%) and F (c(F)=0.015 wt.-%).

Solid LiOH from Leached LiOH Filtrate

The filtrate obtained from the experiment described above is then treated by drying to yield solid LiOH as monohydrate, said LiOH containing fluoride. Two different procedures are applied to adjust the fluoride content:

(A) From 150 mL of the filtrate containing 0.49 wt.-% lithium and 0.015 wt.-% fluoride, the water was completely evaporated (40° C., 42 mbar). LiOH·LiF.1 was obtained. An XRD of LiOH·LiF.1 reveals minor impurities of $Li_2CO_3$. The latter is due to contact with air during most of the process steps. Next to carbon-based impurities, the elemental analysis reveals fluoride as one of the main impurities (c(F)=0.5 wt.-%).

(B) Another 150 mL of a filtrate originating from another LiOH leaching experiment containing 0.49 wt.-% lithium and 0.015 wt.-% fluoride was concentrated by evaporation (40° C., 42 mbar) by a factor of 6 (c(Li) =2.94 wt.-%), filtered and finally dried applying 40° C. and a constant flow of nitrogen for 24 h. An XRD of LiOH·LiF.2 reveals minor impurities of $Li_2CO_3$. The latter is due to contact with air during most of the process steps. Next to carbon-based impurities, the elemental analysis reveals fluoride as one of the main impurities (c(F)=0.25 wt.-%).

I.3 Synthesis of a $Li_2CO_3$ that Contains Fluoride, Step (b.2)

$CO_2$ was introduced into an LiOH solution containing 2.6 wt.-% lithium and 0.017 wt.-% fluoride for seven hours (ambient conditions, ~5 L/h). Immediately, white solids became visible. After 7 hours the solids were filtered off, dried and analyzed by XRD as well as by elemental analysis (Li=19.0 wt.-%, F=0.22 wt.-%).

II. Manufacture of cathode active materials

II.1 Mixing Step, Step (c.1), and Calcination, Step (d.1)

Step (c.1): Precursor TM-OH.1 and LiOH·LiF.1 and $Al_2O_3$, average crystallite size 6 nm, were mixed in a MICROTRON laboratory mixer from Kinematica in a molar ratio of Al/(Ni+Co+Mn)=0.01, and Li/Ni+Co+Mn+Al=1.02:1 for three times one minute.

Step (d.1): The mixture from step (c.1) is heated to 780° C. and kept for 6 h in a forced flow of oxygen. After cooling to ambient temperature, the resultant powder is deagglomerated and sieved through a 32 μm mesh. CAM.1 is obtained. No fluoride accumulation can be detected.

D50=12 μm determined using the technique of laser diffraction in a Mastersizer 3000 instrument from Malvern Instruments. The Li and transition metal content are determined by ICP analytics. Residual moisture at 250° C. was determined to be below 300 ppm.

The electrochemical testing was carried out in coin half cells to show an excellent $1^{st}$ cycle discharge capacity and cycling stability.

II.2 Manufacture of Cathode Active Material CAM.2

"Battery grade" LiOH·$H_2O$, hereinafter also referred to as "LiOH b.g.", commercially available from Livent, with a fluoride content of less than 5 ppm is used to partially replace LiOH·LiF.1.

Step (c.2): Precursor TM-OH.1 and a mixture of LiOH b.g. and LiOH·LiF.1 and $Al_2O_3$, average crystallite size 6 nm, were mixed in a MICROTRON laboratory mixer from Kinematica in a molar ratio of Al/(Ni+Co+Mn)=0.01, and Li/Ni+Co+Mn+Al=1.02:1 for three times one minute. The weight ratio of LiOH b.g. to LiOH·LiF.1 is 1:1. A mixture is obtained.

Step (d.2): Step (d.1) is repeated but with the mixture resulting from step (c.2). After cooling to ambient temperature, the resultant powder is deagglomerated and sieved through a 32 μm mesh. CAM.2 is obtained. No fluoride accumulation can be detected.

The electrochemical testing was carried out in coin half cells to show an excellent $1^{st}$ cycle discharge capacity and cycling stability.

II.3 Manufacture of a Comparative Cathode Active Material, C-CAM.3

Comparative Step C-(b.3):

LiOH·$H_2O$ b.g., is mixed with LiF in a weight ratio of 99.66:0.34, corresponding to CAM.1. A premix is obtained. As visible from the crystals, there are still LiF crystals in the premix.

Step C-(c.3): Precursor TM-OH.1 and premix from step C-(b.3) and $Al_2O_3$, average particle diameter 6 nm, were mixed in a MICROTRON laboratory mixer from Kinematica in a molar ratio of Al/(Ni+Co+Mn)=0.01, and Li/Ni+Co+Mn+Al=1.02:1 for three times one minute. A mixture is obtained.

Step C-(d.3): Step (d.1) is repeated but with the mixture resulting from step C-(c.3). After cooling to ambient temperature, the resultant powder is deagglomerated and sieved through a 32 μm mesh. C-CAM.3 is obtained. Several samples of C-CAM.3 displayed different and inconstant behavior compared to CAM.1 and CAM.2.

III Testing of Cathode Active Material

III.1 Cathode Manufacture, General Procedure

Positive electrode: PVDF binder (Solef® 5130) was dissolved in NMP (Merck) to produce a 7.5 wt. % solution. For electrode preparation, binder solution (3 wt. %) and carbon black (Super C65, 3 wt.-%) were suspended in NMP. After mixing using a planetary centrifugal mixer (ARE-250, Thinky Corp.; Japan), inventive CAM (or comparative CAM) (94 wt. %) was added and the suspension was mixed again to obtain a lump-free slurry. The solid content of the slurry was adjusted to 61%. The slurry was coated onto Al foil using a KTF-S roll-to-roll coater (Mathis AG). Prior to use, all electrodes were calendared. The thickness of cathode material was 100 μm, corresponding to 6.5 mg/$cm^2$. All electrodes were dried at 105° C. for 7 hours before battery assembly.

III.2 Electrolyte Manufacture

A base electrolyte composition was prepared containing 1 M $LiPF_6$ in 3:7 by weight ethylene carbonate and ethyl methyl carbonate (EL base 1).

III.3 Test Cell Manufacture

Coin-type half cells (20 mm in diameter and 3.2 mm in thickness) comprising a cathode prepared as described under 111.1 and lithium metal as working and counter electrode, respectively, were assembled and sealed in an Ar-filled glove box. In addition, the cathode and anode and a separator were superposed in order of cathode/separator/Li foil to produce a half coin cell. Thereafter, 0.15 mL of the EL base 1 which is described above (11.2) were introduced into the coin cell.

IV. Evaluation of Cell Performance

Evaluation of Coin Half-Cell Performance

Cell performance were evaluated using the produced coin type battery.

The initial performance and rate performance were measured as follows: Coin half cells according to III.3 were tested in a voltage range between 4.3 V to 3.0 V at 25° C. For the initial cycles, charge and discharge were conducted in the CC mode, i.e., a constant current (CC) of 0.1 C was applied until reaching 4.3V during charge or 3.0V during discharge, respectively. After initial formation cycles, rate property was measured in CC mode with a constant discharge current of 3 C.

Cycle performance and resistance growth were tested as follows: After the evaluation of initial performance, the coin cells were cycled with a constant 0.5 C charge current and a constant 1 C discharge current at 25° C. for 100 cycles. Resistance growth was measured at the beginning of each discharge cycle by determining the voltage drop after 30 seconds.

Batteries based on inventive cathode active materials are superior. In particular, CAM.1 and CAM.2 show increased cycling stability and reduced resistance growth compared to C-CAM.3. In particular, several samples of C-CAM.3 showed entirely different electrochemical behavior. Without wishing to be bound by any theory, we assume that some samples of C-CAM.3 contain fluoride and others do not.

The invention claimed is:

1. A process for manufacture of a fluoride doped cathode active material, wherein said process comprises the steps of (a) providing a particulate oxide or (oxy) hydroxide of transition metals (TM), wherein TM is a combination of metals according to general formula (I), and wherein said particulate oxide or (oxy) hydroxide has an average particle diameter (D50) in a range of from 3 to 16 μm, $$(Ni_aCo_bMn_c)_{1-d}M_d \quad (I)$$

with a being in a range of from 0.6 to 0.99, b being zero or in a range of from 0.01 to 0.2, c being in a range of from zero to 0.2, and d being in a range of from zero to 0.1, M is at least one of Al, Mg, Ti, Mo, Nb, Ta, W and Zr, and $$b + c > \text{zero, and } a + b + c = 1,$$

(b) providing a source of lithium that comprises 0.01 to 2.5% by weight of fluoride uniformly dispersed within said source of lithium, wherein the source of lithium is selected from the group consisting of lithium hydroxide, lithium oxide, and lithium carbonate, (c) mixing said oxide or (oxy) hydroxide of TM with said fluoride-comprising source of lithium and, optionally, with an additional source of lithium comprising less fluoride, and, optionally, with one or more dopants based on at least one metal other than lithium, and (d) treating the mixture obtained from step (c) thermally.

2. The process according to claim 1, wherein the source of lithium is selected from the group consisting of lithium hydroxide and lithium oxide.

3. The process according to claim 1, wherein step (d) is performed at a temperature in a range of from 600 to 950° C.

4. The process according to claim 1, wherein the additional source of lithium is free of fluoride, and wherein a weight ratio of the fluoride-comprising source of lithium and the fluoride-free source of lithium is in a range of from 1:1 to 1:20.

5. The process according to claim 1, wherein the additional source of lithium is free of fluoride, and wherein said mixing step (c) is performed in at least two sub-steps (c1) mixing the fluoride-comprising source of lithium and fluoride-free source of lithium and, optionally, said one or more dopants, (c2) mixing the mixture obtained from step (c1) with said oxide or (oxy)hydroxide of TM.

6. The process according to claim 1, wherein the one or more dopants are selected from the group consisting of oxides and hydroxides of Al, Mg, and transition metals selected from the group consisting of Ti, Mo, Nb, Ta, W and Zr.

7. The process according to claim 1, wherein said source of lithium in which fluoride is uniformly dispersed is obtained by a recycling process of spent batteries.

8. The process according to claim 1, wherein said fluoride is lithium fluoride.

9. The process according to claim 1, wherein stoichiometry of lithium in step (c) is in a range of from 90 to 95 mol-% relative to a sum of TM and metals other than lithium from the one or more dopants, if applicable, and step (d) is followed by another mixing step with a source of lithium and another thermal treatment step.

* * * * *